United States Patent Office 3,799,755
Patented Mar. 26, 1974

3,799,755
PROCESS FOR THE MANUFACTURE OF A PLANT SUBSTRATE BODY
David Rack, Schwarzgrabenweg 17, Salzburg, Austria
No Drawing. Continuation-in-part of abandoned application Ser. No. 216,225, Jan. 7, 1972. This application Apr. 25, 1973, Ser. No. 354,230
Claims priority, application Austria, Jan. 12, 1971,
A 197/71
Int. Cl. C05f 11/02
U.S. Cl. 71—24   6 Claims

ABSTRACT OF THE DISCLOSURE

Peat and/or soil is dried to a maximum water content of 8–14%, by weight, and the dried peat and/or soil is mixed with a liquid composition of reactants forming an elastic polyurethane foam. The resultant foam contains 20% to 60%, by weight, of the peat and/or soil as an effective plant growth medium supporting the root structure of a plant placed in the substrate foam.

---

The present application is a continuation-in-part of my copending application Ser. No. 216,225, filed Jan. 7, 1972, now abandoned.

This invention relates to a substrate body for permanently supporting the growth of plant roots.

Plant growth media have been proposed wherein plant nutrients, fertilizers or other soil-improving materials are incorporated in plastic foams. Experience has shown that such soil substitutes cannot be used for any length of time to promote plant growth in the manner of natural soil or peat. One of the reasons for this appears to be the high electrostatic charge accumulating on the foam.

In my prior application Ser. No. 41,355, filed May 28, 1970, I have proposed a shape-retaining plant substrate comprising a clump of soil and/or peat moss, and a polyurethane binder free of foaming or expanding agent mixed with the soil and/or peat moss and binding the particles thereof. Such a substrate can be used without a sheath or casing without crumbling so that it may be readily transported without a container, and then used as a permanent substrate for supporting plant growth. On the other hand, the specific gravity of such a body is fairly high.

It is an object of the invention to provide a process for the manufacture of a plant substrate body which is not only simple and economical but which optimally promotes the growth of plants in a substrate body which is uniform, elastic, porous and respiration-promoting, and through which the plant roots may grow well, having free water at their disposal.

Standard soil and/or peat moss being materials suited for promoting plant growth, I have found that it is practically impossible to use them as plant growth promoting fillers in a polyurethane foam body unless their normal water content of about 45%, by weight, has first been reduced to about 8–14%, by weight.

In the process of manufacturing a plant substrate body according to the present invention, a plant-growth promoting particulate material selected from the group consisting of peat and standard soil is dried to reduce its water content to 8–14%, by weight, the dried material is mixed with a liquid composition of reactants including a blowing agent forming an elastic polyurethane foam, and the mixture is foamed by the blowing agent whereby the plant growth-promoting material is organically bonded by the foam to form the substrate body, the amount of the particulate material being such that the foam contains 20% to 60%, preferably about 40%, by weight, of the material.

If desired, fertilizers and/or other soil-improving materials compatible with the liquid composition, i.e. which do not interfere with the foaming process, may also be incorporated in the mixture.

The liquid composition may be wholly conventional and contain, for instance, as A component a polyether having a high molecular weight (3000–4000) and a low OH number (25–65), a wetting agent having a low molecular weight (50–500) and a high OH number, a conventional foam stabilizer, and a conventional activator, and as B component a commercially available di- or polyisocyanate, or a mixture of different isocyanates. Liquid compositions of reactants forming an elastic polyurethane foam are well known.

By way of example, a homogeneous composition is made from 100 parts by weight of the A component of a foamable polyurethane mixture, 35–40 parts by weight of peat and/or standard soil, and 0–15 parts by weight of another plant substrate material, which may be organic or inorganic.

This homogeneous mixture is thoroughly mixed with 100 parts by weight of the B component of a foamable polyurethane mixture.

While the invention is not limited thereto, the following specific examples illustrate the practice thereof, all parts being by weight.

EXAMPLE 1

| | Parts |
|---|---|
| Polyether polyol "Desmophen 3800" | 100 |
| Silicon oil (additive "SI") | 1.5 |
| Amine activator "Desmorapid CO" | 0.20 |
| Stannous activator "Desmorapid SO" | 0.40 |
| Water (as blowing agent) | 4 |
| Peat having a water content of 8% | 40 |
| Plant nutrients | 10 |
| Isocyanate "Desmodur T 80" | 50 |

EXAMPLE 2

Example 1 was repeated but only two parts of water were used as blowing agent and the peat component was replaced by 42 parts of standard soil having a water content of 12%.

All the above trademarks are those of BASF, of Germany.

The resultant mixture is permitted to foam in a container of suitable size constituting a mold for the substrate body. After completing the foaming reaction within a few minutes, a foam body of large volume and low specific gravity results. This body may be cut into smaller shapes of any desired geometrical configuration to produce plant substrate bodies ready for use.

The composition of the polyurethane foam is so selected that the end product has a very low specific gravity of about 15–60 kilograms per cubic meter whereas its percentage of solids volume is very high. This has the advantage that such plant substrate bodies may be handled with great ease and convenience without crumbling. They constitute excellent permanent plant growth media and have proved highly suitable for the cultivation and shipment of roses and other delicate ornamental shrubs.

This plant substrate body may also be used for growing lawns when it is subjected to a simple aftertreatment by the action of pressure and heat. In this aftertreatment, additional material, for instance a sheeting through which grass may grow, may be incorporated as a protective intermediate layer for controlling the moisture content of the substrate body, if this is required. By such an aftertreatment of the foam body, the specific gravity thereof is increased to about 50–100 kilograms per square meter, and its carrying capacity is much increased while its properties promoting plant life, such as its respiration-promoting plant life, such as its respiration-promoting activity, its excellent water-controlling capacity and the fact that plants grow well through the foam, are preserved. Such a substrate foam body enables the formation of a fine lawn carpet even on a base of bare rock. Considerable areas of arable land may be reclaimed in this manner.

The heat and pressure treatment may be effected, for instance, by a press or pressure roll having a temperature of about 160° C. This treatment, lasting for instance about two minutes, will reduce the thickness of the foam plate or sheet from about 10 mm. to about 5 mm.

The rootstock of plants implanted in substrate bodies made according to the present invention remains firmly bonded therein throughout the life thereof and ensures a sterile growth almost free of loss and in the absence of weeds because any weed seeds which may be contained in the peat or soil will be killed by the exothermic reaction heat generated during the foaming process.

The plant substrate body manufactured according to this invention may be used as a lawn mat for the fixation of subsoil on slopes which are susceptible to elutriation and rock slides, e.g. on slopes at the sides of highways.

While applicant does not wish to be bound by any theories, it is known that peat contains about 6% bound water so that a peat having a moisture content of 6% contains no free water which could participate in a reaction. Peat having a water content of 8% theoretically contains 2% free water which may react. Since water operates as a blowing agent in polyurethane foam systems in certain stoichiometric amounts, the free water in the peat or standard soil used in the present invention plays a significant role in the formation of the substrate. Thus, the particulate material dried to the moisture content of the invention produces an amount of 2-8% free water, i.e. an amount of water producing a certain foaming action. If a natural peat or standard soil having a water content of about 45% were used, the amount of free water would be 39%, which would cause such excess foaming that the foam would be decomposed entirely and the polyurethane reaction would fail. Thus, the drying of the peat or standard soil to an 8-14% moisture content makes the preparation of the present substrate possible.

The 2-8% free water derived from the particulate material produces an open-pored foam which is very advantageous for the use thereof as a plant growth medium or substrate. Thus, the free water coming from the microporous peat particles produces, during foaming, an open foam or sponge structure extending from the capillary surface structure of the peat particles and surrounding the same, transmitting the strongly hydrophilic character of the peat to the surrounding polyurethane foam at the interface between them. In this manner, the free water coming from the peat during the foaming reaction produces an open-pored hydrophilic foam. This water-adsorptive and water-delivering character of the foam gives it its excellent quality as a plant growth medium.

On the other hand, if the entire amount of water necessary for the blowing reaction would be added from the outside, instead of coming from the peat or soil used in the mixture, i.e. if a peat were used which was dried to a water content of 6% or less, a polyurethane foam would be formed around the peat particles which has closed pores and which is not in direct connection with the particles of peat or soil. An insulating layer of polyurethane foam would be formed at the interface of the capillary peat surface and the surrounding foam, rather than the open pores of the foam entering into the capillaries. This would cause the resultant composite mass to lose the hydrophilic character of peat or soil to a large extent.

I claim:
1. A process for the manufacture of a plant substrate body, which comprises foaming a mixture comprising a plant growth-promoting, particulate material selected from the group consisting of peat and standard soil, the material having a water content reduced to about 8% to 14%, by weight, and a liquid composition of reactants including a blowing agent forming an elastic polyurethane foam whereby the plant growth-promoting material is organically bonded by the foam to form the substrate body, the amount of the plant growth-promoting material being such that the substrate contains from 20% to 60%, by weight, of the material.

2. The process of claim 1, wherein a fertilizer is incorporated into the mixture.

3. The process of claim 1, wherein the liquid composition comprises an A component including a polyether having a molecular weight of 3000 to 4000 and an OH number of 25-65 and a wetting agent having a low molecular weight of 50-500 and a high OH number, a foam stabilizer and an activator, and a B component including at least one isocyanate.

4. The process of claim 1, further comprising the step of subjecting the formed substrate body to heat and pressure to increase the specific gravity thereof.

5. The process of claim 1, wherein the mixture is foamed in contact with a perforate plastic material sheeting through which plants may grow.

6. The process of claim 1, wherein the substrate contains about 40%, by weight, of said plant growth-promoting material.

References Cited
UNITED STATES PATENTS

| | | | |
|---|---|---|---|
| 3,417,171 | 12/1968 | Eberle et al. | 71—64 R |
| 3,472,644 | 10/1969 | Woodside et al. | 71—1 |
| 2,192,939 | 3/1940 | Slayter et al. | 71—64 G |
| 3,077,700 | 2/1963 | Tukacs | 71—24 X |
| 526,512 | 9/1894 | Weber et al. | 71—64 A |

JOHN ADEE, Primary Examiner

U.S. Cl. X.R.

71—64 A, 64 G